(12) United States Patent
Garcia-Martinez

(10) Patent No.: US 10,559,013 B2
(45) Date of Patent: Feb. 11, 2020

(54) IDENTIFYING USERS FOR ADVERTISING OPPORTUNITIES BASED ON PAIRED IDENTIFIERS

(71) Applicant: Facebook, Inc.

(72) Inventor: Antonio Felipe Garcia-Martinez, Alameda, CA (US)

(73) Assignee: Facebook, Inc., Menlo Park, CA (US)

( * ) Notice: Subject to any disclaimer, the term of this patent is extended or adjusted under 35 U.S.C. 154(b) by 241 days.

(21) Appl. No.: 13/789,463

(22) Filed: Mar. 7, 2013

(65) Prior Publication Data
US 2014/0257999 A1    Sep. 11, 2014

(51) Int. Cl.
*G06F 16/00*    (2019.01)
*G06Q 30/02*    (2012.01)

(52) U.S. Cl.
CPC .................. *G06Q 30/0275* (2013.01)

(58) Field of Classification Search
CPC ........... G06Q 30/0261; G06Q 30/0267; G06Q 30/0269; G06Q 30/02; G06Q 30/0241; G06Q 30/0255; G06Q 30/0275; G06Q 30/08
USPC ........... 705/14.66, 14.53, 14.58, 14.64, 14.4, 705/14.49, 14.71
See application file for complete search history.

(56) References Cited

U.S. PATENT DOCUMENTS

| | | | |
|---|---|---|---|
| 2005/0165643 A1 | 6/2005 | Wilson et al. | |
| 2007/0239528 A1 | 10/2007 | Xie et al. | |
| 2008/0103903 A1* | 5/2008 | Flake et al. | 705/14 |
| 2008/0255944 A1* | 10/2008 | Shah et al. | 705/14 |
| 2008/0262917 A1 | 10/2008 | Green et al. | |

(Continued)

FOREIGN PATENT DOCUMENTS

| | | |
|---|---|---|
| CN | 101617332 A | 12/2009 |
| JP | 2005-222500 A | 8/2005 |

(Continued)

OTHER PUBLICATIONS

PCT International Search Report and Written Opinion, PCT Application No. PCT/US2014/020816, dated Jun. 20, 2014, fifteen pages.

(Continued)

*Primary Examiner* — John Van Bramer
*Assistant Examiner* — Darnell A Pouncil
(74) *Attorney, Agent, or Firm* — Fenwick & West LLP (57) ABSTRACT

An online system facilitates auctions for advertising presentation opportunities by identifying users associated with the presentation opportunities. The online system stores mappings between user identifiers and a plurality of partner identifiers used by advertisers to identify browsers. Partner identifiers are received from an advertising exchange and used to identify a user identifier corresponding to the received partner identifier. Using the identified user identifier, the online system identifies an alternative partner identifier associated with the user identifier and sends the alternative user identifier to an advertiser for use in selecting and bidding on advertisements. The online system returns the advertisers' bids to the advertising exchange with the partner identifier received from the advertising exchange. Converting a partner identifier to another allows advertisers to target a particular user while the online system protects the user's identify.

12 Claims, 5 Drawing Sheets

(56) References Cited

U.S. PATENT DOCUMENTS

| | | | |
|---|---|---|---|
| 2010/0324999 A1* | 12/2010 | Conway et al. | 705/14.73 |
| 2011/0099576 A1 | 4/2011 | Shkedi et al. | |
| 2011/0231240 A1* | 9/2011 | Schoen et al. | 705/14.41 |
| 2011/0246297 A1* | 10/2011 | Buchalter et al. | 705/14.53 |
| 2012/0130813 A1 | 5/2012 | Hicken et al. | |
| 2012/0150641 A1 | 6/2012 | Dobbs et al. | |
| 2012/0158522 A1 | 6/2012 | Nazer Zadeh et al. | |
| 2012/0166520 A1 | 6/2012 | Lindsay et al. | |
| 2012/0203627 A1* | 8/2012 | Balseiro et al. | 705/14.46 |
| 2012/0284746 A1 | 11/2012 | Evans et al. | |
| 2013/0124332 A1* | 5/2013 | Doughty et al. | 705/14.66 |
| 2013/0124628 A1* | 5/2013 | Weerasinghe | 709/204 |
| 2013/0173815 A1* | 7/2013 | Canning et al. | 709/228 |
| 2013/0238745 A1* | 9/2013 | Ramachandran et al. | 709/217 |

FOREIGN PATENT DOCUMENTS

| | | |
|---|---|---|
| JP | 2008-524701 A | 7/2008 |
| JP | 2009-531783 A | 9/2009 |
| JP | 2013-020461 A | 1/2013 |
| KR | 10-2009-0000690 A | 1/2009 |

OTHER PUBLICATIONS

Anonymous, "Same-origin policy—Wikipedia," Feb. 26, 2013, XP055423520, five pages. [Online] [Retrieved Feb. 20, 2019] Retrieved from the Internet <URL:https://en.wikipedia.org/w/index.php?title=Same-origin_policy&oldid=540724698.>.

Anonymous, "URL redirection—Wikipedia", Feb. 28, 2013, XP055423511, twelve pages. [Online] [Retrieved on Feb. 20, 2019] Retrieved from the Internet <URL:https://en.wikipedia.org/w/index.php?title=URL redirection&oldid=541087144.>.

Anonymous, "Web beacon—Wikipedia," Feb. 28, 2013, XP055423507, five pages. [Online] [Retrieved on Feb. 20, 2019] Retrieved from the Internet <URL:https://en.wikipedia.org/w/index.php?title=Web beacon&oldid=541342289.>.

Canadian Intellectual Property Office, Office Action, Canadian Patent Application No. 2,901,587, dated May 31, 2017, five pages.

Canadian Intellectual Property Office, Office Action, Canadian Patent Application No. 2,901,587, dated Sep. 7, 2018, four pages.

European Patent Office, Examination Report, European Patent Application No. 14158138.9, dated Jul. 6, 2016, six pages.

European Patent Office, Summons to attend oral proceedings pursuant to Rule 115(1) EPC, European Patent Application No. 14158138.9, Jan. 3, 2018, twelve pages.

Fielding, R., "Hypertext Transfer Protocol—HTTP/1.1," Jun. 30, 1999, XP055004067, 100 pages. [Online] [Retrieved Feb. 20, 2019] Retrieved from the Internet <URL: https://tools.ietf.org/pdf/draft-fielding-httpbis-http-semantics-00.pdf.>.

Japan Patent Office, Office Action, Japanese Patent Application No. 2015-561616, dated Feb. 27, 2018, five pages.

State Intellectual Property Office of the People's Republic of China, Office Action, Chinese Patent Application No. 201480026064.7, dated Jun. 4, 2018, seventeen pages.

Australian Second Examination Report, Australian Application No. 2014225748, dated Aug. 26, 2019, 6 pages.

Anonymous, "Real-Time Bidding—Wikipedia" Feb. 26, 2013, 4 pages, [Online] [Retrieved on Aug. 28, 2019] Retrieved from the Internet <URL: https://en.wikipedia.org/w/index.php?title=Real-time_bidding&oldid=540770367>.

* cited by examiner

Match Table 300

|  | User ID | Browser ID | Partner ID |
|---|---|---|---|
| 302 | Sebastian | B_987 | ABC |
| 304 | -logged out- | B_654 | ZYQ |
| 306 | Viola | B_987 | ABC |
| 308 | Viola | B_123 | TSV |
| 310 | Olivia | B_654 | ZYQ |

IDENTIFYING USERS FOR ADVERTISING OPPORTUNITIES BASED ON PAIRED IDENTIFIERS

BACKGROUND

This invention relates generally to advertising, and in particular to identifying users for advertising impressions in social networking and other online systems.

Advertisers pay web content publishers to present their advertisements ("ads") to users who access the publishers' content. The advertisers often seek to present ads to users likely to be interested in their products or services and most likely to purchase the advertised products or services. Accordingly, if a user is more likely to purchase an advertised product or service, an advertiser may increase the amount paid to the publisher to present the ads to that user.

To identify users likely to interact with an advertisement or likely to purchase advertised products or services, advertisers or advertising partners often store online browsing activity of users. Based on users' browsing activity, the advertiser or advertising partner may increase the amount offered to an online system to present advertisements to users that visited certain websites or purchased certain items. However, advertisers typically index stored browsing activity based on the browser used to perform the browsing. Because users may use multiple browsers for online browsing, and multiple users may use the same browser, advertisers may incorrectly target their advertisements if they rely on browser-indexed history to identify potentially-interested users.

SUMMARY

An online system interfaces between an advertisement ("ad") exchange and advertising partners, also referred to as "partner systems," to identify users when opportunities arise to present advertisements to the users. In one embodiment, the online system identifies associations between a user identifier and a browser identifier for online system users. Additionally, the online system associates an advertiser's or an advertising partner's identification of the user's browser with a pairing of user identifier and browser identifier. When the online system receives a request to present an ad to a target user from the ad exchange, the online system identifies a user identifier associated with the target user and sends one or more advertising partners a partner identifier of a browser associated with the user identifier of the target user. Using the partner identifier, the advertising partner retrieves a browsing history stored by the advertising partner and associated with the partner identifier of the browser. Based on the retrieved browsing history, the advertising partner identifies an advertisement on which to provide bids to the online system or determines a bid amount for an advertisement.

Users may use multiple browsers to access the online system and external websites. Accordingly, each browser may be associated with a unique partner identifier used by a partner system (or "advertising partner") to store different browsing histories. When a user accesses web content through a particular browser, the ad exchange may request bids for advertisements based on the partner identifier associated with the particular browser. In one embodiment, the online system receives the request for bids on an ad including a browser identifier for a browser currently used by a user, but selects a partner identifier associated with a different browser when requesting bids from a partner system. This allows the partner system to target advertising to the user even when user uses a browser different from the browser associated with a browsing history stored by the partner system.

The features and advantages described in this summary and the following detailed description are not all-inclusive. Many additional features and advantages will be apparent to one of ordinary skill in the art in view of the drawings, specification, and claims. For example, although embodiments of the invention are discussed with reference to a social networking system, embodiments of the invention may be used with other online systems that can match a user's identity across multiple devices and/or browsers may be used.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
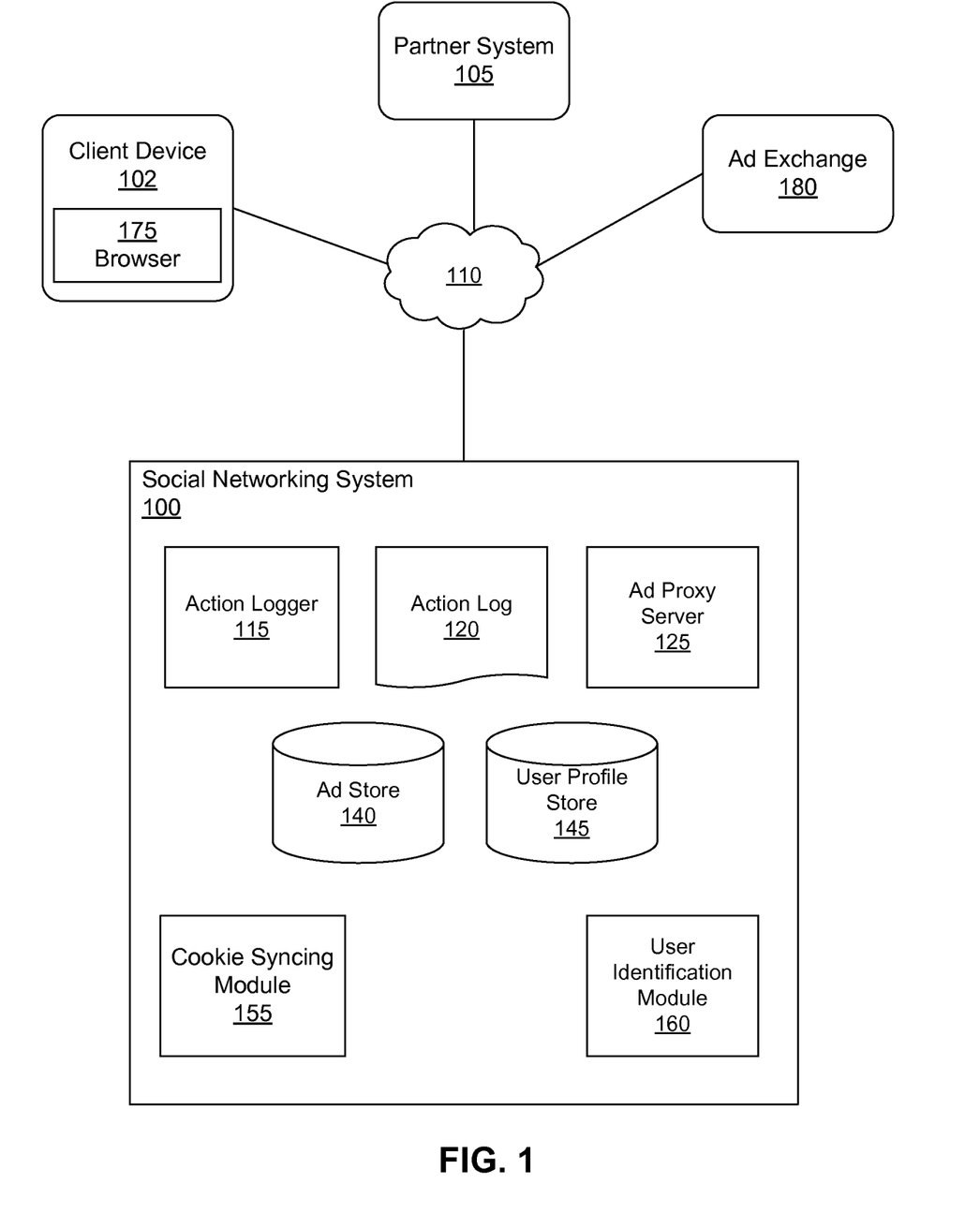
FIG. 1 is a block diagram of a system environment including a social networking system, according to one embodiment.

FIG. 1 is a block diagram of one embodiment of a system environment including a social networking system 100. FIG. 1 also shows the system architecture of the social networking system 100 as computer-executable program modules. As used herein, the term "module" refers to computer program logic and/or data for providing specified functionality. A module may be implemented in hardware, in firmware, and/or in software. Conventional components such as network interfaces, security mechanisms, load balancers, failover servers, management and network operations consoles, and the like are not shown so as to not obscure the details of the system. Moreover, although embodiments are described herein with respect to a social networking system, one of skill in the art would recognize that the described functions may be performed by other online systems.

The social networking system 100 offers its users the ability to communicate and interact with other users. In use, users join the social networking system 100 and add connections to a number of other users to whom they desire to be connected. As used herein, the term "friend" refers to any other user to which a user has formed a connection, association, or relationship via the social networking system 100. Connections may be added explicitly by a user (e.g., a user selecting another to be a friend), or may be created by the social networking system 100 based on common characteristics of the users (e.g., users who are alumni of the same educational institution).

The social networking system 100 allows its users to take actions on various types of objects maintained by the social networking system 100. These objects may include groups or networks (where "networks" here refer not to physical communication networks, but rather to social networks of people) to which users of the social networking system 100 may belong, events or calendar entries in which a user might be interested, computer-based applications that a user may use via the social networking system 100, and transactions that allow users to buy, sell, auction, rent, or exchange items via the social networking system 100. These are merely examples of the objects upon which a user may act on a social networking system 100, and many others are possible.

The social networking system 100 shown in FIG. 1 includes an action logger 115, an action log 120, an advertisement ("ad") proxy server 125, an ad store 140, a user profile store 145, a cookie syncing module 155, and a user identification module 160. In other embodiments, the social networking system 100 may include additional, fewer, or different modules for various applications.

The action logger 115 identifies interactions of users internal to the social networking system 100 and performed on other systems, and logs the information in the action log 120. User interactions internal to the social networking system 100 include interactions between users, interactions between a user and a page within the social networking system 100, interactions between a user and a post on a page, and user visits to or interactions with a page outside the social networking system 100 including plug-ins for communicating data to the social networking system 100. Examples of user actions external to the social networking system 100 include purchasing or reviewing a product or service using an online marketplace hosted by a third-party website, registering with or subscribing to a website hosted by a third-party application server, requesting information from a third-party website, and other similar actions. When an action is taken on and/or off the social networking system, an entry for the action is generated by the action logger 115 and stored in the action log 120.

After an amount of time, the action log 120 is populated with a number of entries describing actions taken by social networking system users. Thus, the action log 120 includes a rich set of data describing user actions, and can be analyzed and filtered to identify trends and relationships in the user actions, as well as affinities between the users and various objects.

The social networking system 100 maintains a user profile for each user. Any action taken by a user and identified by the action logger 115 is associated with the user's user profile. Examples of actions include: establishing connections with other users, viewing content associated with other users, joining a group, attending an event, adding an application, or completing a transaction with another user. The user profile store 145 stores user profiles describing social networking system users. Examples of information included in a user profile include biographic information, demographic information, and other types of descriptive information, such as work experience, educational history, hobbies or preferences, location, and the like. When a user manually enters information to a corresponding user profile, such as name, location, sex, age, and date of birth, the information is stored in the user profile store 145. In one embodiment, the user profile store 145 also stores login or authentication information for a user that is referenced when a user attempts to log in to the social networking system 100.

A client device 102 interacts with the social networking system 100 through the network 110, which is a communication pathway between the client device 102, a partner system 105, an ad exchange 180, and/or the social networking system 100. In one embodiment, the network 110 is the Internet. However, the network 110 may be any communication pathway, such as a local area network (LAN), a metropolitan area network (MAN), a wide area network (WAN), a mobile wired or wireless network, a private network, or a virtual private network. In one embodiment, the network 110 uses standard communications technologies and/or protocols. Examples of protocols used on the network 110 include the transmission control protocol/Internet protocol (TCP/IP), the hypertext transport protocol (HTTP), the file transfer protocol (FTP), etc. Data exchanged over the network 110 may be represented using technologies and/or formats including the hypertext markup language (HTML), the extensible markup language (XML), etc. In some embodiments, data may be exchanged over the network 110 using custom and/or dedicated data communications technologies instead of, or in addition to, the ones described above.

The client device 102 may be a desktop computer, a laptop computer, a portable computer, a personal digital assistant (PDA), a smart phone, or any other device including computing functionality and data communication capabilities. A plurality of client devices 102 may be configured to communicate via the network 110. Although FIG. 1 shows a single client device 102, many client devices 102 may interact with social networking system 100.

In one embodiment, the client device 102 executes one or more browsers 175, which may be used by users to access the social networking system 100 or other content via the network 110. In one embodiment, a user logs into an account on the social networking system 100 to access a personalized set of web pages, such as a user profile page and a newsfeed page, using a browser 175. When a user logs in to its account with the social networking system 100, the social networking system 100 writes one or more cookies to the client device 102, such as to the browser 175, identifying the user and the browser. For example, a cookie including a user identifier associated with the user by the social networking system 100 is stored and a cookie including a browser identifier is stored by the client device 102; the cookie including the browser identifier may include data identifying a browser type. While the user is logged in to the social networking system 100 using the browser 175, the cookie including the user identifier is stored by the browser 175. The cookie including the browser identifier is stored until it is deleted by the user or deleted by the browser 175. In one embodiment, users may opt out of receiving cookies from the social networking system 100 to prevent the social networking system 110 from storing cookies using the browser 175.

The partner system 105 (also referred to as an "advertising partner") interacts with the social networking system 100 through the network 110. In one embodiment, the partner system 105 is a demand-side platform (DSP) bidding on and purchasing advertising impressions (i.e., presentation of advertisements) for an advertiser. For example, an advertiser interacts with the partner system 105 to specify advertising constraints, such as targeting criteria and maximum budget. An advertiser may also provide the partner system 105 with advertisement requests ("ad requests") or ad tags identifying ad requests stored in the ad store 140 of the social networking system 100. Using the advertising constraints, the partner system 105 bids on presentation of advertisement content included in an ad request of the advertiser to users of the social networking system 100 or to users of other online systems. Although a single partner system 105 is illustrated in FIG. 1, a plurality of partner systems 105 may interact with the social networking system 100 to bid on advertising impressions. Each partner system 105 may bid on behalf of many advertisers.

In one embodiment, partner systems 105 determine whether users satisfy targeting criteria associated with ad requests by monitoring Internet browsing behaviors of the users. For example, a partner system 105 bids on presenting an advertisement to a social networking system user based on the user's behavior on other websites, including web pages visited, keywords searched, items purchased, etc. A user may opt out of tracking, which prevents the partner system 105 from monitoring the user. In one embodiment, the partner system 105 uses a web bug or a tracking pixel placed on third-party websites to monitor users visiting the websites that have not opted out of tracking. The tracking pixel is a segment of HTML code that the partner system 105 adds to third-party websites. For example, a tracking pixel is a transparent 1×1 image, an iframe, or other suitable object. When a user's browser 175 requests the content of a page having the tracking pixel, the content of the tracking pixel is also requested from the partner system 105. The request for the content of the tracking pixel includes information about the client device 102 and the browser 175, such as the Internet Protocol (IP) address of the client device 105, and cookies the partner system 105 has set in the browser 175. In one embodiment, a cookie set by the partner system 105 includes an identification of the browser 175 by the partner system 105, which is referred to herein as a "partner identifier."

For example, a user searches for flights to Vienna, Austria on a travel website partnered with the partner system 105. A tracking pixel included on the travel website by the partner system 105 informs the partner system 105 of the search. If the browser 175 used to visit the website does not include a cookie previously set by the partner system 105, the partner system 105 sets a cookie on the browser 175 and stores a partner identifier of the browser and the search information. If the browser 175 includes a cookie associated with the partner system 105, the partner system 105 retrieves the partner identifier of the browser from the cookie and adds the search for flights to Vienna to previously-stored information associated with the retrieved partner identifier describing activity of the browser 175.

The partner system 105 may maintain a log of browsing activity indexed by partner identifiers. Examples of information included in the log include: visiting web pages, searching for information or products, and purchasing products. When opportunities arise to present advertisements using a browser 175 identified by a partner identifier, the partner system 105 bids on one or more of the opportunities to provide an advertiser's advertisements. For example, a website may allocate space for presentation of three advertisements along with website content and requests ads for filling the three spaces from the partner system 105. Accordingly, the partner system 105 submits bids to the website identifying one or more advertisements for one or more of the three spaces. The bids may be based on the stored browsing history associated with a partner identifier corresponding to the browser 175 and any advertisement targeting criteria. For example, an airline may work with the partner system 105 to advertise flights offered by the airline to various destinations in Europe. If a user has recently (e.g., in the last day) searched for flights to Vienna, the partner system 105 may bid on an opportunity to present an advertisement via the browser 175 along with website content including a search for flights based on the prior search for flights to Vienna using the browser 175.

Bids placed by the partner system 105 specify a value that a partner system 105 (or an advertiser represented by the partner system 105) will pay to present the ad to a user. In one embodiment, the bid value is based on a degree of similarity between interests of the user and targeting criteria of an ad. For example, an airline may specify targeting criteria for advertisements for flights to Europe that specify an age range (e.g., 21- to 35-years old) and recent interactions associated with flights to a particular European destination. Hence, the partner system 105 may place a bid with a large value for presenting advertisements for flights to Vienna to a 25-year-old user that has recently searched for flights to Vienna, while placing a bid with a smaller value for presenting the same user with advertisements for flights to Berlin.

In one embodiment, website publishers may interface with an ad exchange 180 rather than directly requesting ad bids from partner systems 105. The ad exchange 180 facilitates buying and selling of opportunities to present ads to users. In one embodiment, the ad exchange 180 interfaces between publishers (e.g., web servers) and a plurality of partner systems 105 or advertisers, receives requests from the publishers to present ads on web pages, and requests bids from partner systems 105 to present advertisement content based on the requests. For example, the ad exchange 180 may run real-time auctions for ad presentation opportunities based on bids placed by the partner systems 105. To facilitate an ad auction, the ad exchange 180 may store cookies to browsers 175 that include an identification of the browser 175 readable by the ad exchange 180 (an "exchange identifier"). The ad exchange 180 may also maintain a database pairing each exchange identifier to one or more partner identifiers associated with partner systems 105. Accordingly, publishers may request ads from the ad exchange 180 by redirecting a user's browser 175 to the ad exchange 180, which retrieves the exchange identifier from the cookie stored by the browser 175, determines partner identifiers associated with the exchange identifier, and sends the partner identifiers to partner systems 105 with requests for bids.

In one embodiment, the social networking system 100 provides an interface between the ad exchange 180 and the partner systems 105 for sending bid requests to and receiving bids from the partner systems 105. For example, the social networking system 100 includes a cookie syncing module 155 that matches cookies identifying a social networking system user and a browser 175 used by the user to access the social networking system 100. In one embodiment, the cookie syncing module 155 associates a user identifier of the social networking system user and a browser identifier. Additionally, the cookie syncing module 155 associates a partner identifier with an association between a user identifier and a browser identifier. For example, a partner identifier is associated with a pairing of user identifier and browser identifier, allowing a partner system 105 to identify a social networking system user from a partner identifier. The cookie syncing module 155 is described in further detail below.

The social networking system 100 may use the association of one or more partner identifiers with a pairing of user identifier and browser identifier to identify users for opportunities to present an advertisement ("ad impression opportunities"). In one embodiment, a user identification module 160 included in the social networking system 100 receives bid requests from the ad exchange 180, determines a user identifier associated with a user associated with the bid request, and selects a partner identifier associated with the user identifier. If a plurality of partner identifiers are associated with a user identifier, the user identification module 160 determines which partner identifier to send to partner system 105 along with a bid request.

The user identification module 160 may select the partner identifier to send to a partner system 105 based on an expected bid value associated with each partner identifier. For example, a partner system 105 may provide the social networking system 100 with relative bid values expected for each partner identifier associated with the partner system 105. For example, if partner identifier A and partner identifier B are both associated with the same user identifier, and a partner system 105 indicates it would place a higher bid value for partner identifier B, the user identification module 160 may select partner identifier B for inclusion in a bid request sent to the partner system 105. Alternatively, the user identification module 160 determines expected bid values for each partner identifier based on values of previous bids placed by the partner system 105 for each of the partner identifiers. For example, the user identification module 160 determines a distribution of the historical bids and calculates the expected bid value based on the distribution. For example, the bids placed by the partner system 105 for partner identifier A may have a higher average value than the bids placed for partner identifier B, so partner identifier A is included in a bid request sent to the partner system 105.

In one embodiment, the social networking system 100 includes the ad proxy server 125, which interfaces between the partner system 105, the ad exchange 180, and the browser 175 to isolate the client device 102 from the partner system 105. When the partner systems 105 bid on ad impression opportunities, the ad proxy server 125 may receive ad requests including advertisement content from the partner system 105 for presentation to users, or may receive ad tags from the partner system 105 identifying ad requests having advertisement content in the ad store 140 for presentation. In one embodiment, the browser 175 retrieves advertisement content from the ad proxy server 125, rather than from the partner system 105 or another ad server. Thus, the ad proxy server 125 acts as a barrier between the partner system 105 and the client device 102, preventing the partner system 105 from correlating user characteristics with individual users, browsers 175, or client devices 102. This reduces data leakage from the client device 102 to a partner system 105, providing increased protection for personal information that social networking system users have not expressly elected to share with partner systems 105.

Cookie Synchronization

If a user has not opted out of receiving cookies from the social networking system 100, the social networking system 100 may store one or more cookies to a browser 175 executing on the client device 102 and used to access the social networking system 100. In one embodiment, the social networking system 100 stores a user identification cookie on a user's browser 175 when the user logs in to the social networking system 100. The user identification cookie includes a user identifier associated with the user accessing the social networking system 100. Until the user logs out of the social networking system or deletes cookies stored by the browser 175, the social networking system 100 may obtain the user identifier from the user identification cookie.

In one embodiment, the social networking system 100 also stores a browser identification cookie on the browser 175. The browser identification cookie includes a browser identifier associated with the browser 175 by the social networking system 100. The social networking system 100 may retrieve the browser identifier from the browser identification cookie until the browser identification cookie is deleted by a user or by the browser 175.

The cookie syncing module 155 of the social networking system 100 identifies and associates user identifiers with browser identifiers. The associations identify combinations of users and browsers 175 that have accessed the social networking system 100 and that have allowed cookies. For example, a user may access an account on the social networking system 100 from multiple browsers executing on the same or on different client devices 102. Accordingly, the cookie syncing module 155 stores multiple associations between the user's user identifier and different browser identifiers associated with each of the browsers 175 used to access the social networking system 100. Similarly, multiple users may access the social networking system 100 from the same browser (e.g., a browser executing on a computer at a public library), so the cookie syncing module 155 stores multiple associations between a single browser identifier and various user identifiers.

Figure 2:
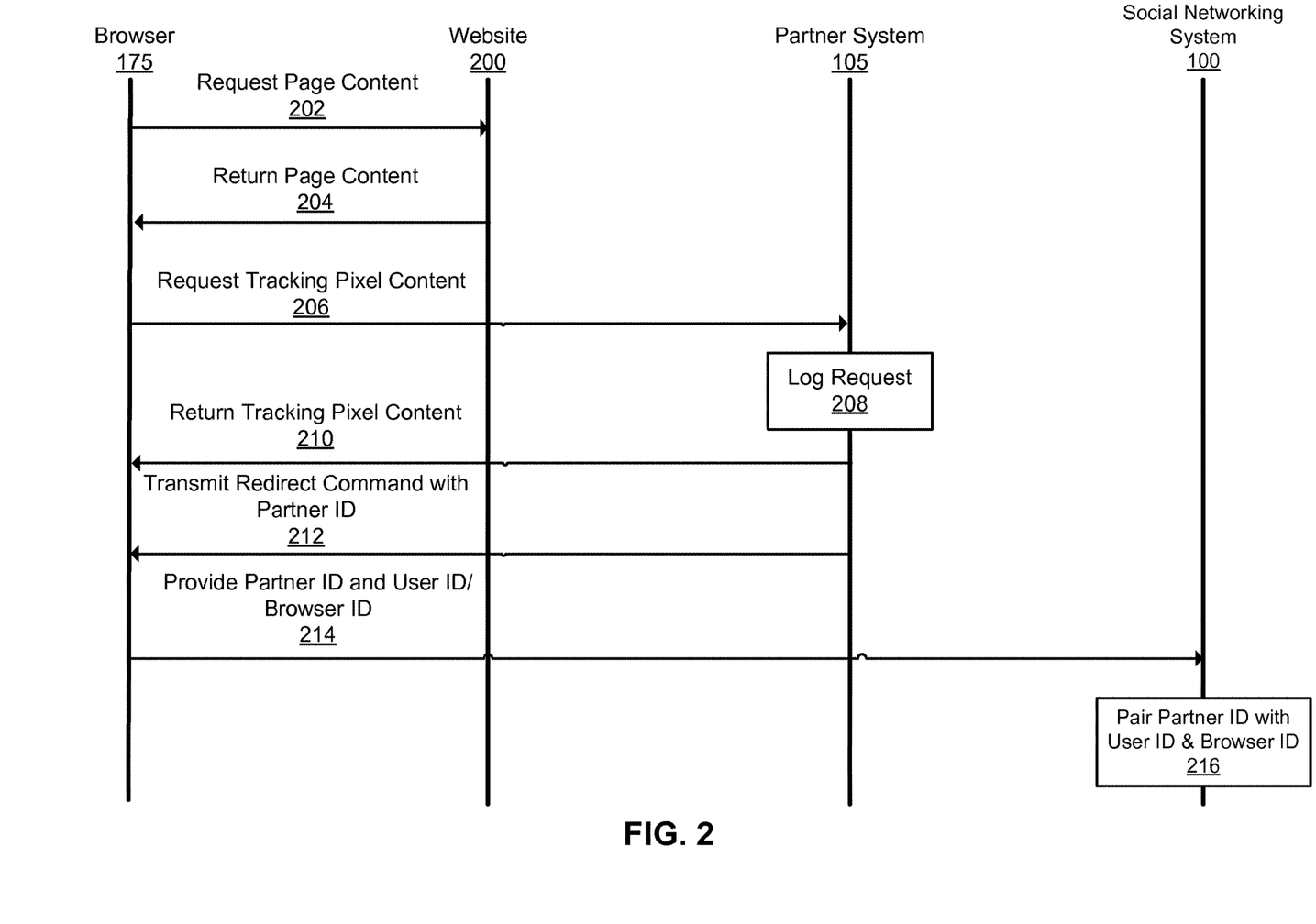
FIG. 2 is an interaction diagram of a process for pairing a partner identifier with a browser identifier and a user identifier, according to one embodiment.

In one embodiment, the cookie syncing module 155 matches a partner identifier to an association between a user identifier and a browser identifier. A process for synchronizing a received partner identifier with an association between a user identifier and a browser identifier is illustrated in FIG. 2. In the example of FIG. 2, interactions between a browser 175, a website 200, a partner system 105, and the social networking system 100 when a user accesses the website 200 are shown. For purposes of illustration, the website 200 comprises a web page including a tracking pixel associated with the partner system 105, and the user of the browser 175 has not opted out of tracking by the partner system 105.

When the user accesses the website 200 using the browser 175, the browser 175 requests 202 content from one or more servers providing content for the website 200 via the network 110. The servers return 204 the requested content to the browser 175 using the network 110. As described above, the website content provided by the one or more servers includes a tracking pixel associated with the partner system 105, so the browser 175 also requests 206 the content of the tracking pixel from the partner system 105. For simplicity, FIG. 2 shows website 200 and partner system 105, but other entities may provide portions of the content requested by the browser 175 based on requests received from the browser 175.

When the browser 175 requests 206 content from the partner system 105, the partner system 105 receives access to cookies stored by the browser 175. If the browser 175 does not include stored cookies associated with the partner system 105 (e.g., the user has not previously visited a website monitored by the partner system 105 or the user has deleted the partner system's cookies), the partner system 105 stores one or more cookies to the browser 175. Additionally, the partner system 105 creates a browser identifier for the browser 175 based on the one or more cookies and logs 208 the content request in association with the browser identifier.

If the browser 175 includes one or more cookies associated with the partner system 105 before requesting 206 the tracking pixel content (e.g., the user has previously visited a website monitored by the partner system 105), the partner system 105 accesses the one or more cookies to retrieve a browser identifier associated with the browser 175 and logs 208 the content request in association with the retrieved browser identifier. Logged data describing the request may include an identification of the website 200, a time of the request, activities of the user on the web page (e.g., items purchased by the user through the website 200), as well as any other suitable information. After logging 208 the request, the partner system 105 returns 210 the content of the tracking pixel to the browser 175 via the network 110.

In one embodiment, the partner system 105 transmits 212 a command to the browser 175 to redirect to the social networking system 100. For example, the partner system 105 returns an HTTP redirect command with the returned content of the tracking pixel; the redirect command may identify a uniform resource locator (URL) or other network identifier associated with the social networking system 100. In one embodiment, the partner system 105 embeds the partner identifier in the URL included in the transmitted redirect command. Based on the received redirect command, the browser 175 redirects to the social networking system 100 and provides 214 the partner identifier embedded in the URL to the social networking system 100.

Figure 3:
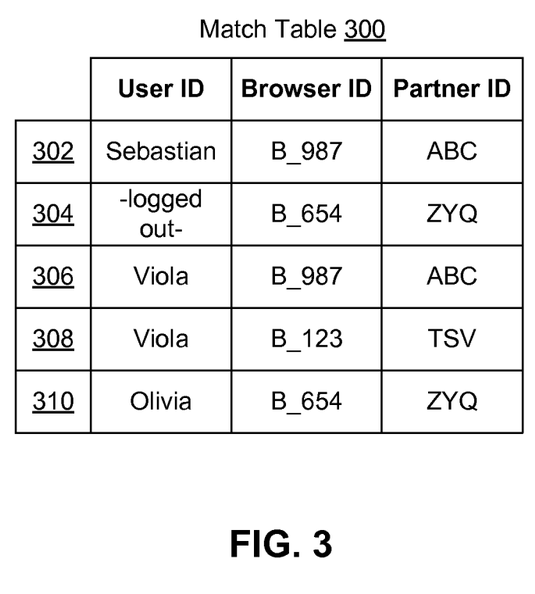
FIG. 3 illustrates an example identification match table, according to one embodiment.

Redirecting to the social networking system 100 allows the social networking system 100 to access cookies stored on the browser 175. For example, if the browser 175 includes cookies specifying one or both of the browser identifier and the user identifier specified by the social networking system 100, the social networking system 100 retrieves the browser identifier and the user identifier and pairs 216 the partner identifier provided when the browser 175 redirects to the social networking system with the retrieved browser identifier and/or the retrieved user identifier. Associating the partner identifier with a browser identifier and/or a user identifier, the cookie syncing module 155 generates a match table 300, as illustrated in FIG. 3, which is stored for later user identification. As shown in FIG. 3, each row of the match table 300 identifies a pairing of user identifier and browser identifier as well as a partner identifier matched to the pairing during the process illustrated in FIG. 2.

For example, the cookie syncing module 155 creates row 302 when a user having the user identifier "Sebastian" logged in to the social networking system 100 using a browser 175 identified by the social networking system 100 by browser identifier "B_987". In this example, the user has visited a website monitored by a partner system 105, which associated the partner identifier "ABC" with the browser 175 using the process described above in conjunction with FIG. 2. To associate the partner identifier with the browser 175, the partner system 105 redirects the browser 175 to the social networking system 100 and embeds the partner identifier "ABC" in the redirect request. The cookie syncing module 155 retrieves the user identifier and browser identifier from one or more cookies stored by the browser 175 and associates the received partner identifier "ABC" with the stored pairing of "Sebastian" and "B_987." A similar process is repeated for rows 304, 306, 308, and 310. Although FIG. 3 illustrates five rows in the match table 300, the match table 300 may have thousands or millions of entries. The match table 300 may also have additional columns corresponding to different partner systems, and the various identifications are merely for the sake of example. In other embodiments, the associations may be organized in a configuration other than a table of entries.

Correlating a partner identifier with an association between user identifier and browser identifier allows the cookie syncing module 155 to identify different users using the same browser or to identify multiple browsers used by a single user. Referring to FIG. 3, rows 302 and 306 of the match table 300 correspond to a browser having the partner identifier "ABC." However, two distinct user identifiers are associated with the partner identifier "ABC," indicating that both user "Sebastian" and user "Viola" used the browser having browser identifier "B_987." As another example, row 306 associates the user identifier "Viola" with browser identifier "B_987" (corresponding to partner identifier "ABC") while row 308 associates the user identifier with browser identifier "B_123" (corresponding to partner identifier "TSV"). This indicates the user "Viola" accessed the social networking system 100 using two different browsers 175.

The cookie syncing module 155 may identify users by matching cookies retrieved at different times. For example, rows 304 and 310 of the match table 300 include entries for a browser identifier "B_654" and a partner identifier "ZYQ." To generate row 310, the cookie syncing module 155 matches the user identifier "Olivia" to the browser identifier "B_654." Row 310 may be generated because user "Olivia" accessed the social networking system using a browser 175 having the browser identifier "B_654" after generation of row 304.

In one embodiment, the cookie syncing module 155 may periodically update the match table 300 by combining rows corresponding to the same information. For example, after creating row 310, the cookie matching module 155 may remove row 304 because row 310 provides the user identifier missing from row 304. In one embodiment, the cookie syncing module 155 determines whether to combine or remove rows of data from the match table 300 based on patterns observed in the data. For example, if a threshold number of user identifiers have been paired to a single browser identifier, the cookie syncing module 155 may identify the browser 175 as being on a public computer, and maintain unique match table entries for each user identifier associated with the common browser identifier.

Identifier Conversion

The social networking system 100 facilitates an auction for ad presentation opportunities based on the generated match table 300. For example, the partner systems 105 and the ad exchange 180 identify browsers 175 based on cookies each system stores in one or more browsers 175. If social networking system user uses multiple browsers 175 to access web content, the match table 300 enables the social networking system 100 to associate partner identifiers associated with multiple browsers with a single user. Accordingly, the match table 300 provides users with more relevant ads and provides partner systems 105 with improved opportunities for bidding on advertising.

Figure 4:
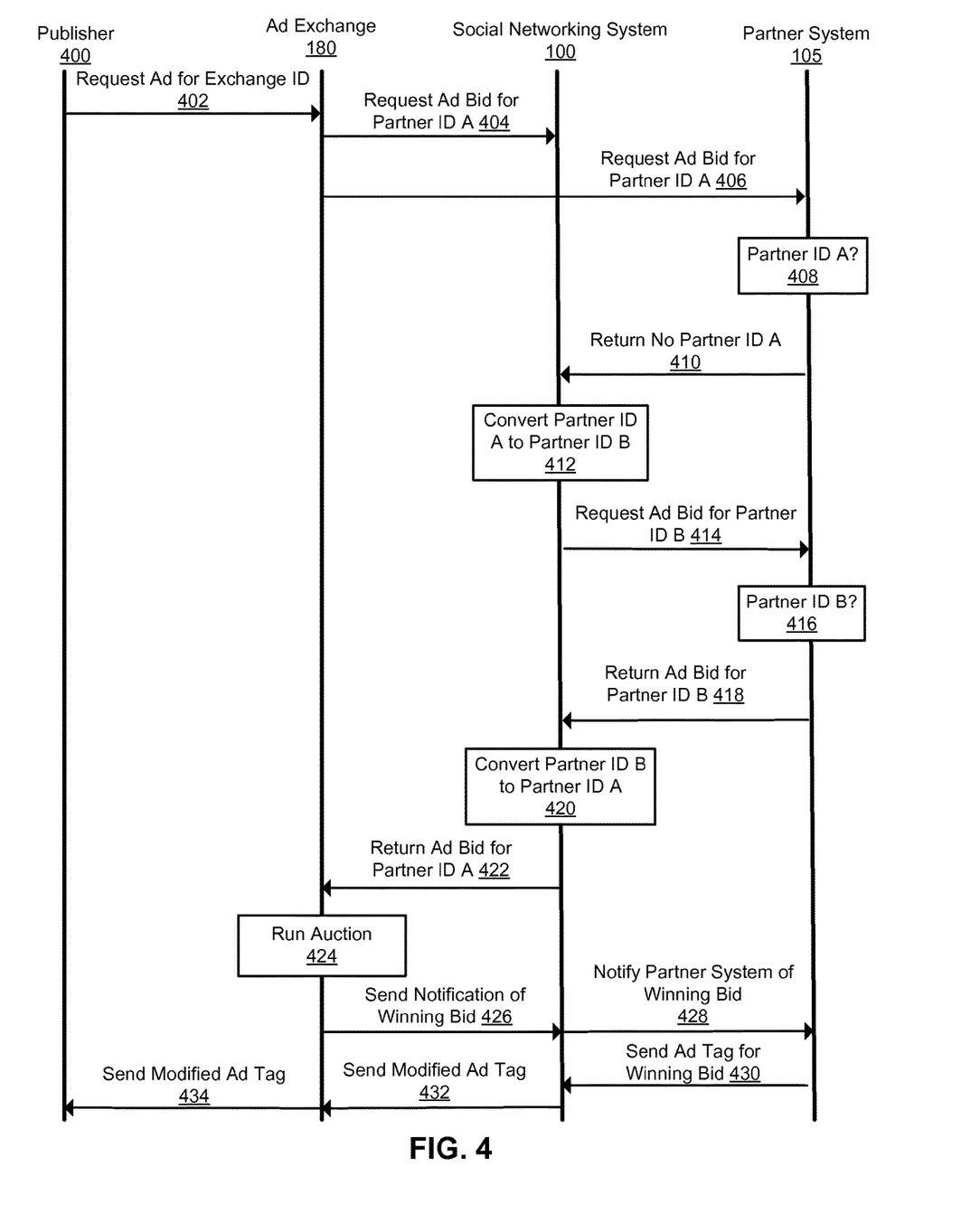
FIG. 4 is an interaction diagram of a process for facilitating an ad auction, according to one embodiment.

FIG. 4 is an interaction diagram of one embodiment of a process for facilitating an ad auction by converting between partner identifiers. The example ad auction shown by FIG. 4 involves a publisher 400, an ad exchange 180, the social networking system 100, and a partner system 105. In FIG. 4, actions are shown chronologically with earlier actions shown at the top of the figure and later actions shown towards the bottom of the figure. Additionally, in FIG. 4 horizontal arrows between entities represent communications between the entities. While a single partner system 105 is illustrated in FIG. 4, many partner systems 105 may interact with the ad exchange 180 and the social networking system 100.

As a user retrieves content via the network 110, the user directs a browser 175 to a page, or other content, of a website hosted by the publisher 400, which allocates a portion of the content for presenting advertisements. For example, the publisher 400 allocates a banner or sidebar region of a web page for displaying ads to users. When the browser 175 requests content from the publisher 170, the publisher 170 requests 402 advertisement content from the ad exchange 180. For example, the publisher 170 requests 402 advertisement content by redirecting the browser 175 to the ad exchange 180, enabling the ad exchange 180 to retrieve an exchange identifier from a cookie stored by the browser 175.

The ad exchange 180 determines a one or more partner identifiers associated with the received exchange identifier and uses a partner identifier to request 404 a bid for an ad request from the social networking system 100. In one embodiment, the ad exchange 180 also requests 406 a bid from the partner system 105. A request for a bid includes the partner identifier determined by the ad exchange 180, referred to in FIG. 4 as "Partner ID A." The partner system 105 determines 408 whether Partner ID A is recognized by the partner system 105. In the example illustrated in FIG. 4, Partner ID A is not recognized by the partner system 105. For example, the partner system 105 does not have stored information about a browsing history associated with Partner ID A. Accordingly, the partner system 105 returns 410 an indication that Partner ID A is not recognized to the social networking system 100.

If a partner identifier transmitted to the partner system 105 is not recognized, the social networking system 100 converts 412 the partner identifier to an alternative partner identifier associated with the same user. For example, the conversion uses the match table 300 generated by the social networking system 100 and the partner identifier selected by the user identification module 160 to convert 412 the partner identifier to an alternative partner identifier. For example, if partner identifier B, which is associated with the same user identifier as partner identifier A, has a greater relative bid value than partner identifier A, the social networking system 100 converts 412 partner identifier A to partner identifier B. Using the alternative partner identifier (referred to in FIG. 4 as "Partner ID B"), the social networking system 100 requests 414 a bid for an ad request from the partner system 105.

If the partner system 105 recognizes 416 the alternative partner identifier (e.g., Partner ID B), the partner system 105 returns 418 a bid for a request to present to the user. A bid may include a bid value specifying an amount the partner system 105 is willing to pay the publisher 400 for presenting advertisement content associated with the ad request in the browser specified by the recognized alternative partner identifier. The social networking system 100 converts 420 the recognized alternative partner identifier to the partner identifier originally sent by the ad exchange 180. In the example of FIG. 4, Partner ID B is recognized 416 by the partner system 105, so the social networking system 100 converts 420 Partner ID B into Partner ID A, which was originally provided by the ad exchange 180. The social networking system 100 returns 422 the bid received from the partner system 105 to the ad exchange 180. The returned bid may include the originally received partner identifier and the bid value provided by the partner system 105.

The ad exchange 180 may collect bids from a plurality of partner systems 105 using steps 404-422. After collecting one or more bids, the ad exchange 180 runs 424 an auction for the advertising opportunity using the one or more bids. The ad exchange 180 sends 426 notification of the winning bid to the social networking system 100, which notifies 428 the partner system 105 of the winning bid. The partner system sends 430 an ad tag to the social networking system 100 indicating the network address of the advertisement content to be delivered to the user.

In one embodiment, the social networking system 100 modifies the received ad tag to prevent the partner system 105 from accessing the user's browser 175. For example, the ad proxy server 125 of the social networking system 100 acts as an intermediate storage and access point for ad content, reducing data leakage from users to the partner systems 105. The ad proxy server 125 retrieves a copy of the ad content to be presented from a location specified by the ad tag. The copy of the ad is stored by the ad proxy server 125, which generates a modified ad tag specifying a network address or other location associated with the ad proxy server 125 from which the copy of the ad content is retrieved. The social networking system 100 sends 432 the modified ad tag to the ad exchange 180, which sends 434 the modified ad tag to the publisher 170. Using the modified ad tag, the browser 175 retrieves the ad from the ad proxy server 125, preventing the partner system 105 or an advertiser from capturing information about the user via the presented ad content.

Figure 5:
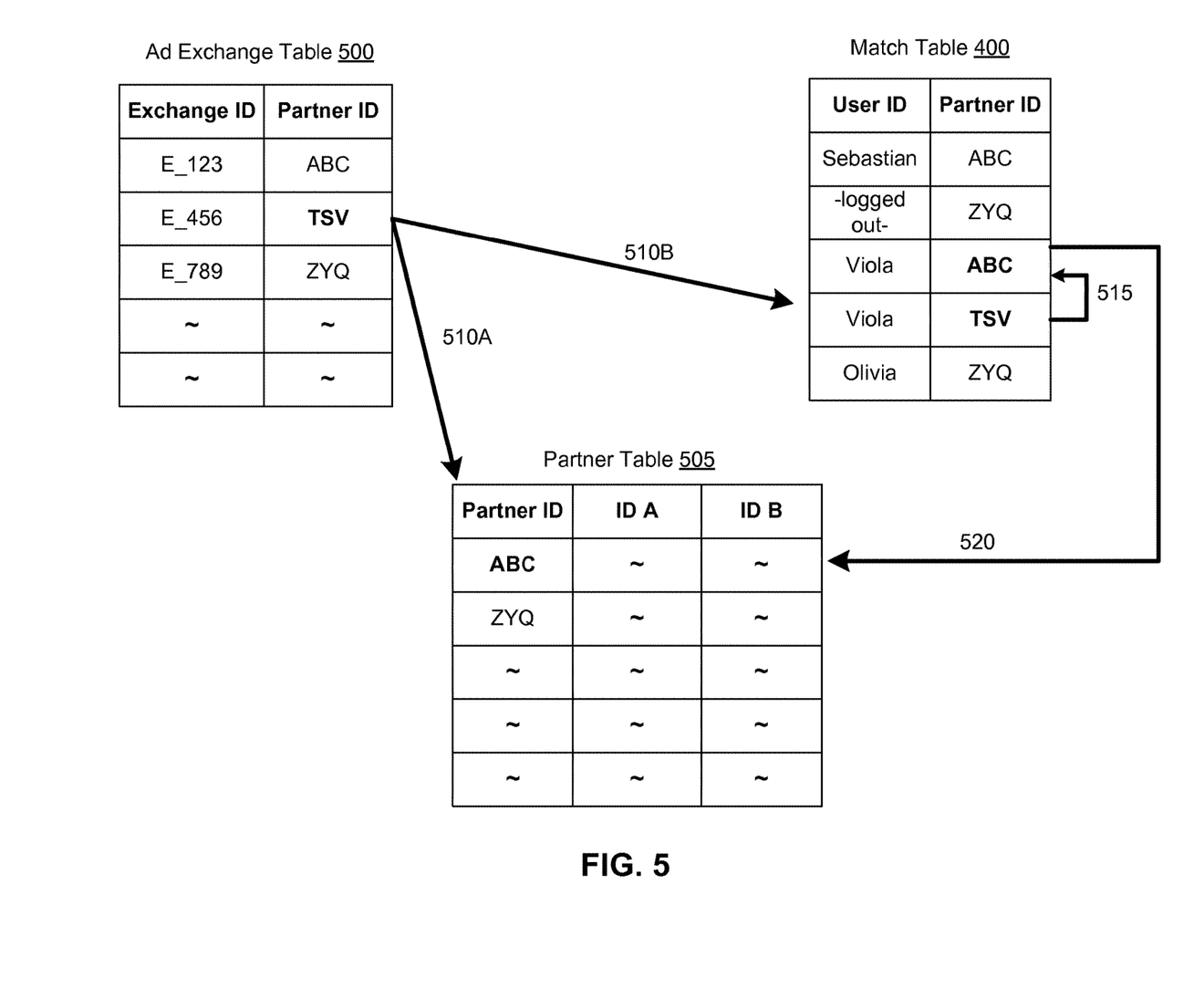
FIG. 5 illustrates an example partner identifier conversion, according to one embodiment.

An example of the process described in conjunction with FIG. 4 is illustrated in FIG. 5. The ad exchange 180 may maintain a table 500 similar to the match table 400. For example, the ad exchange 180 sets a cookie in a user's browser that enables the exchange 180 to identify the browser. When a user visits a site monitored by the partner system 105, the ad exchange 180 may receive partner identifiers when the partner system 105 redirects the user's browser 175 to the exchange 180. The ad exchange 180 retrieves the browser's exchange identifier from the cookie stored by the user's browser 175 and pairs the exchange identifier with a received partner identifier to construct the ad exchange table 500.

When the ad exchange 180 receives the request for ad content from the publisher 170, the ad exchange 180 identifies the browser by retrieving an exchange identifier from a cookie stored by the browser 175. The ad exchange 180 accesses the table 500 to determine a partner identifier associated with the exchange identifier. In the example illustrated in FIG. 5, the determined partner identifier is "TSV".

As illustrated by arrows 510A and 510B, the ad exchange 180 sends the determined partner identifier, "TSV," to the social networking system 100 when requesting 404 a bid; the ad exchange 180 may also send the determined partner identifier, "TSV," to the partner system 105 when requesting a bid. The partner system 105 maintains a partner table 505, which may be a database maintained by the partner system 105, including browsing history or other information about users indexed by the partner identifiers. When receiving a request for a bid from the ad exchange 180, the partner system 105 determines if the partner identifier specified by the request 406 is included in the partner table 505. In the example of FIG. 5, the determined partner identifier of "TSV" is not included in the partner table 505.

The social networking system 100 also receives the request for a bid from the ad exchange 180 and converts 412 the partner identifier "TSV" to the partner identifier "ABC," as indicated by arrow 515. For example, the match table 400 maintained by the social networking system 100 indicates that the user corresponding to the user identifier "Viola" has used different browsers corresponding to the partner identifiers "ABC" and "TSV". Based on the shared pairing to "Viola", the social networking system 100 converts 412 the determined partner identifier of "TSV" into the alternative partner identifier "ABC". As indicated by the arrow 520, the alternative partner identifier, "ABC," is sent to the partner system 105 in a request for a bid. In the example of FIG. 5, the partner table 505 includes browsing history indexed by the alternative partner identifier "ABC," so the partner system 105 uses the browsing history indexed by the alternative partner identifier to bid on the ad presentation opportunity.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, a plurality of login requests from a user of the online system from a plurality of client devices;
   for each login request of the plurality of login requests received from a client device of the plurality of client devices:
      storing a client identifier in a Hypertext Transfer Protocol (HTTP) cookie on a client device of the user used to make the login request, the client identifier identifying the client device of the user to the online system;
      storing a client device association in one or more match tables at the online system, the client device association indicating an association between a user identifier of the user and the client identifier;
   receiving a plurality of redirect requests from one or more of the plurality of client devices of the user, each redirect request including a partner identifier transmitted by a partner system that identifies the one or more of the plurality of client devices to the partner system, the partner identifier stored in a HTTP cookie on the corresponding client device of the user by the partner system;
   storing, a one or more partner system associations at the one or more match tables at the online system, each partner system association indicating an association between the user identifier of the user and a partner identifier of one or more partner identifiers received in the plurality of redirect requests;
   receiving from an ad exchange over a network, a first notification of an opportunity to present an advertisement to the user of the online system, the first notification sent by the ad exchange to the online system and the partner system, the first notification including a first partner identifier identifying a client device being used by the user, the first partner identifier determined by the ad exchange based on an identifier in a HTTP cookie stored a client device of the user;
   receiving a notification from the partner system that the first partner identifier is not recognized at the partner system;
   responsive to the notification from the partner system, accessing the one or more match tables to select an alternative partner identifier based on the stored partner system associations between the user identifier of the user and the one or more partner identifiers by:
      determining a user identifier associated with the first partner identifier;
      selecting the alternative partner identifier as a partner identifier that is associated with the user identifier and which is separate from the first partner identifier;
   generating by the online system, a second notification of the opportunity to present an advertisement to the user of the online system, the second notification including the alternative partner identifier; and
   sending the second notification to the partner system, the partner system adapted to use the alternative partner identifier to generate a bid for presenting the advertisement to the user of the online system.

2. The method of claim 1, further comprising:
   receiving a bid for the opportunity to present the advertisement from the partner system, the bid including a bid value; and
   transmitting the bid value to the ad exchange, the ad exchange configured to select a partner system for presenting advertisement content using the opportunity to present the advertisement based on a plurality of received bid values.

3. The method of claim 2, further comprising:
receiving from the partner system, an ad tag specifying a location of advertisement content to be using the ad presentation opportunity;
retrieving a copy of the advertisement content from the location specified by the ad tag;
storing the copy of the advertisement content in a location associated with the online system;
modifying the ad tag to specify a the location associated with the online system; and sending the modified ad tag to the ad exchange.

4. The method of claim 1, wherein selecting the alternative partner identifier comprises:
determining an expected bid value for each of the plurality of partner identifiers associated with the user identifier of the user; and
selecting the alternative partner identifier based on the expected bid values.

5. The method of claim 4, wherein determining the expected bid values comprises:
receiving relative bid values associated with a plurality of partner identifiers from the partner system; and
determining the expected bid value for each of the plurality of partner identifiers associated with the user identifier of the user based on the received relative bid values.

6. The method of claim 4, wherein determining the expected bid values comprises:
determining a distribution of bid values previously placed by the partner system for each of the plurality of partner identifiers associated with the user identifier of the user; and
determining the expected bid value for a partner identifier associated with the user identifier of the user based on the determined distribution.

7. A non-transitory computer-readable medium storing computer program instructions, the computer program instructions executable to perform steps comprising:
receiving, a plurality of login requests from a user of the online system from a plurality of client devices;
for each login request of the plurality of login requests received from a client device of the plurality of client devices:
storing a client identifier in a Hypertext Transfer Protocol (HTTP) cookie on a client device of the user used to make the login request, the client identifier identifying the client device of the user to the online system;
storing a client device association in one or more match tables at the online system, the client device association indicating an association between a user identifier of the user and the client identifier;
receiving a plurality of redirect requests from one or more of the plurality of client devices of the user, each redirect request including a partner identifier transmitted by a partner system that identifies the one or more of the plurality of client devices to the partner system, the partner identifier stored in a HTTP cookie on the corresponding client device of the user by the partner system;
storing, a one or more partner system associations at the one or more match tables at the online system, each partner system association indicating an association between the user identifier of the user and a partner identifier of one or more partner identifiers received in the plurality of redirect requests;
receiving from an ad exchange over a network, a first notification of an opportunity to present an advertisement to the user of the online system, the first notification sent by the ad exchange to the online system and the partner system, the first notification including a first partner identifier identifying a client device being used by the user, the first partner identifier determined by the ad exchange based on an identifier in a HTTP cookie stored a client device of the user;
receiving a notification from the partner system that the first partner identifier is not recognized at the partner system;
responsive to the notification from the partner system, accessing the one or more match tables to select an alternative partner identifier based on the stored partner system associations between the user identifier of the user and the one or more partner identifiers by:
determining a user identifier associated with the first partner identifier;
selecting the alternative partner identifier as a partner identifier that is associated with the user identifier and which is separate from the first partner identifier;
generating by the online system, a second notification of the opportunity to present an advertisement to the user of the online system, the second notification including the alternative partner identifier; and
sending the second notification to the partner system, the partner system adapted to use the alternative partner identifier to generate a bid for presenting the advertisement to the user of the online system.

8. The non-transitory computer readable medium of claim 7, the instructions further executable to perform steps comprising:
receiving from the partner system a bid for the opportunity to present the advertisement, the bid including a bid value; and
transmitting the bid value to the ad exchange, the ad exchange configured to select a partner system for presenting advertisement content using the opportunity to present the advertisement based on a plurality of received bid values.

9. The non-transitory computer-readable medium of claim 8, the instructions further executable to perform steps comprising:
receiving from the partner system, an ad tag specifying a location of advertisement content to be using the ad presentation opportunity;
retrieving a copy of the advertisement content from the location specified by the ad tag;
storing the copy of the advertisement content in a location associated with the online system;
modifying the ad tag to specify a the location associated with the online system; and sending the modified ad tag to the ad exchange.

10. The non-transitory computer-readable medium of claim 7, wherein selecting the alternative partner identifier comprises:
determining an expected bid value for each of the plurality of partner identifiers associated with the user identifier of the user; and
selecting the alternative partner identifier based on the expected bid values.

11. The non-transitory computer-readable medium of claim 10, wherein determining the expected bid values comprises:

receiving from the partner system, relative bid values for a plurality of partner identifiers; and determining the expected bid value for each of the plurality of partner identifiers associated with the user identifier of the user based on the received relative bid values.

12. The non-transitory computer-readable medium of claim 10, wherein determining the expected bid values comprises:

determining a distribution bid values previously received from the partner system for each of the plurality of partner identifiers associated with the user identifier of the user; and determining the expected bid value for a partner identifier associated with the user identifier of the user based on the determined distribution.

* * * * *

UNITED STATES PATENT AND TRADEMARK OFFICE
CERTIFICATE OF CORRECTION

| | | |
|---|---|---|
| PATENT NO. | : 10,559,013 B2 | Page 1 of 1 |
| APPLICATION NO. | : 13/789463 | |
| DATED | : February 11, 2020 | |
| INVENTOR(S) | : Antonio Felipe Garcia-Martinez | |

It is certified that error appears in the above-identified patent and that said Letters Patent is hereby corrected as shown below:

On the Title Page

Item (71), delete "Facebook, Inc." and insert -- Facebook, Inc., Menlo Park, CA (US) --.

In the Claims

Column 15, Line 12, Claim 3, delete "a" and insert -- the --.
Column 16, Line 54, Claim 9, delete "a" and insert -- the --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*